(12) United States Patent
Maddela et al.

(10) Patent No.: US 10,577,710 B2
(45) Date of Patent: Mar. 3, 2020

(54) METHOD OF COATING BODY-IN-WHITE STRUCTURE HAVING AT LEAST ONE SURFACE COMPRISING AN ALUMINUM ALLOY

(71) Applicant: GM Global Technology Operations LLC, Detroit, MI (US)

(72) Inventors: Surender Maddela, Rochester Hills, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 15/804,948

(22) Filed: Nov. 6, 2017

(65) Prior Publication Data

US 2019/0136401 A1 May 9, 2019

(51) Int. Cl.
| | |
|---|---|
| *C25D 13/22* | (2006.01) |
| *C25D 13/12* | (2006.01) |
| *C09D 5/44* | (2006.01) |
| *C25D 13/02* | (2006.01) |
| *C25D 13/04* | (2006.01) |
| *C25D 13/20* | (2006.01) |

(52) U.S. Cl.
CPC ............. *C25D 13/22* (2013.01); *C09D 5/443* (2013.01); *C25D 13/02* (2013.01); *C25D 13/04* (2013.01); *C25D 13/12* (2013.01); *C25D 13/20* (2013.01)

(58) Field of Classification Search
CPC ........ C25D 13/22; C25D 13/02; C25D 13/04; C25D 13/20; C09D 5/443; C09D 5/4488; C23G 1/00; C23G 3/00; C23C 22/34; C23C 22/68; C23C 22/50; C23C 22/53; C23C 22/83; C23C 2222/10; Y10T 428/31678; Y10T 428/12556; Y10T 428/12569; Y10T 428/12951; Y10T 428/12792; Y10T 428/12847
See application file for complete search history.

(56) References Cited

U.S. PATENT DOCUMENTS

| 6,168,868 B1 | 1/2001 | Hauser et al. |
|---|---|---|
| 7,241,371 B2 | 7/2007 | Stoffer et al. |
| 7,531,074 B2 | 5/2009 | Purdy et al. |

(Continued)

FOREIGN PATENT DOCUMENTS

| CN | 109750341 A | 5/2019 |
|---|---|---|
| DE | 102018127345 A1 | 5/2019 |

*Primary Examiner* — Xiuyu Tai
(74) *Attorney, Agent, or Firm* — Harness, Dickey & Pierce, P.L.C.

(57) ABSTRACT

A method for forming an adhesion promoting layer and a corrosion resistant layer over the surfaces of a body-in-white ("BIW") structure is provided. The method includes immersing the BIW structure in a pre-activating bath to pre-activate the surfaces of the BIW structure. The surfaces of the BIW structure comprise at least an aluminum alloy surface, at least a surface comprising ferrous metal, zinc, or TiZr, and the surfaces are substantially free of magnesium alloys. An adhesion promoting layer comprising cerium and a corrosion resistant layer comprising polymers are subsequently deposited over the pre-activated surfaces of the BIW structure by immersing the BIW structure in an aqueous bath comprising a source of cerium cations and a polymer precursor.

17 Claims, 2 Drawing Sheets

(56) References Cited

U.S. PATENT DOCUMENTS

| | | |
|---|---|---|
| 7,695,771 B2 | 4/2010 | Ostrovsky |
| 7,906,002 B2 | 3/2011 | Shimoda et al. |
| 8,187,439 B2 | 5/2012 | Wang et al. |
| 8,832,921 B2 | 9/2014 | Marks et al. |
| 2006/0099439 A1* | 5/2006 | Kochilla .............. C09D 5/4488 428/626 |
| 2009/0266714 A1 | 10/2009 | Kaneko et al. |
| 2011/0031126 A1* | 2/2011 | Wang .................... C23C 22/68 205/188 |
| 2015/0064482 A1 | 3/2015 | Fan et al. |
| 2016/0348248 A1 | 12/2016 | Fan et al. |

* cited by examiner

METHOD OF COATING BODY-IN-WHITE STRUCTURE HAVING AT LEAST ONE SURFACE COMPRISING AN ALUMINUM ALLOY

FIELD

The present disclosure relates to methods of providing preliminary coatings on mixed-metal bodies-in-white that include aluminum alloy surfaces.

BACKGROUND

This section provides background information related to the present disclosure which is not necessarily prior art.

Body in white ("BIW") refers to an automobile body's metal components (e.g., the frame, which may comprise the front section, front fenders, side walls, rear section, and rear fenders; the front door assemblies; the rear door assemblies; the engine hood; the roof; and the trunk lid) that have been joined together (e.g., by welding, hemming, clinching, bolting, and the like) in the process of automobile manufacturing, before painting and before moving parts, the engine, chassis sub-assemblies, and trim have been assembled into the automobile.

After the BIW is formed, the BIW is prepared for painting, which includes enhancing the adhesion and corrosion resistance of the surfaces of the BIW. According to some processes where phosphating the BIW is conducted to enhance adhesion, as many as eight to ten process steps are undertaken, including without limitation the following. First, the BIW is degreased, followed by rinsing the BIW, then conditioning the BIW, followed by phosphating the BIW to enhance adhesion of a subsequent corrosion resistant layer. Before the corrosion resistant layer may be applied, the BIW is again rinsed, then the phosphate layer is passivated, after which the BIW is again rinsed, and then the rinsing agent is drained from the BIW. The BIW is then ready for application of a corrosion resistant layer, which typically is accomplished by applying a polymer layer over the BIW.

Magnesium present on the BIW can behave aggressively and prevent phosphate coating formation on other metals present on the BIW, for example. Thus, other processes for preparing a BIW for painting, where the BIW has at least one surface comprising a magnesium alloy, include the following steps. First, the BIW is spray cleaned. The BIW is then cleaned yet again by dipping the BIW in a cleaning bath. After cleaning, the BIW is rinsed. The BIW is then immersed in an electrocoat paint operation tank (also known as an ELPO tank), where it is coated with an adhesion enhancing layer comprising a source of cations and oxygen and a corrosion resistance layer comprising a polymer. The BIW is then rinsed, the rinsing agent is then blown off, and the BIW is then baked in a baking oven to complete the polymerization of the polymer. Developing new streamlined processes for providing an adhesion coating and corrosion coating would be desirable.

SUMMARY

This section provides a general summary of the disclosure, and is not a comprehensive disclosure of its full scope or all of its features.

In certain aspects, the present disclosure provides a method of forming an adhesion promoting layer and a corrosion resistant layer over surfaces of a body-in-white ("BIW") structure. The method may include pre-activating surfaces of the BIW structure by immersing the BIW structure in a pre-activating bath to form pre-activated surfaces on the BIW structure. The surfaces of the BIW structure include at least an aluminum alloy surface and a metallic surface including a metal selected from the group consisting of: iron (Fe), zinc (Zn), titanium (Ti), zirconium (Zr), and alloys and combinations thereof. The method also includes forming an adhesion promoting layer including cerium over the pre-activated surfaces of the BIW structure by immersing the pre-activated surfaces of the BIW structure in an aqueous bath including a source of cerium cations and a polymer precursor. The cerium cations coat the pre-activated surfaces of the BIW structure during application of a potential to the aqueous bath to form the adhesion promoting layer including cerium over the surfaces of the BIW structure. The method also includes forming a corrosion resistant layer including a polymer formed from the polymer precursor over the adhesion promoting layer including cerium while the potential is applied to the aqueous bath. The polymer thus deposits over the adhesion promoting layer on the surfaces of the BIW structure.

In one aspect, the surfaces of the BIW structure are substantially free of magnesium alloys.

In one aspect, the potential is applied to the aqueous bath within a voltage range of 0 V to about −250 V.

In one aspect, after the pre-activating the surfaces of the BIW structure, the BIW structure is removed from the pre-activation bath and directly transferred to the aqueous bath to deposit the adhesion promoting layer and the corrosion resistant layer.

In one aspect, prior to the pre-activating the surfaces of the BIW structure, the surfaces of the BIW structure are degreased and rinsed.

In one aspect, after the corrosion resistant layer is deposited on the BIW structure, the BIW structure is removed from the aqueous bath, rinsed, and the polymer forming the corrosion resistant layer is cured.

The present disclosure also contemplates a method of forming an adhesion promoting layer and a corrosion resistant layer over surfaces of a BIW structure. The method includes pre-activating surfaces of the BIW structure by immersing the BIW structure in a pre-activating bath to form pre-activated surfaces on the BIW structure. The surfaces of the BIW structure include at least an aluminum alloy surface and a metallic surface including a metal selected from the group consisting of: iron (Fe), zinc (Zn), titanium (Ti), zirconium (Zr), and alloys and combinations thereof, but the surfaces of the BIW structure are substantially free of magnesium alloys. The method further includes forming a multilayer cerium-based electrocoat over the pre-activated surfaces of the BIW structure by immersing the pre-activated surfaces of the BIW structure in an aqueous bath including a source of cerium cations and a polymer precursor and applying a potential to the aqueous bath to deposit the cerium cations in a first layer and a polymer in a second layer over the first layer.

In one aspect, the first layer is an adhesion promoting layer including a cerium coating and the second layer is a corrosion resistant layer including the polymer.

In one aspect, the potential is applied to the aqueous bath within a voltage range of 0 V to about −250 V.

In one aspect, after the corrosion resistant layer is formed on the BIW structure, the BIW structure is removed from the aqueous bath, rinsed, and the polymer coating forming the corrosion resistant layer is cured.

In one aspect, prior to pre-activating the surfaces of the BIW structure, the surfaces of the BIW structure are degreased and rinsed.

The present disclosure further contemplates a method of forming an adhesion promoting layer and a corrosion resistant layer over surfaces of a BIW structure for use in a continuous process. The method includes pre-activating the surfaces of the BIW structure by transporting and immersing the BIW structure in a pre-activating bath to form pre-activated surfaces on the BIW structure. The surfaces of the BIW structure include at least an aluminum alloy surface and a metallic surface including iron (Fe), zinc (Zn), titanium (Ti), zirconium (Zr), and alloys and combinations thereof, where the surfaces are substantially free of magnesium alloys. The method further includes forming an adhesion promoting layer including cerium over the pre-activated surfaces of the BIW structure and forming a corrosion resistant layer over the adhesion promoting layer by transporting and immersing the pre-activated surfaces of the BIW structure in an aqueous bath. The aqueous bath includes a source of cerium cations and a polymer primer. The adhesion promoting layer includes cerium and the corrosion resistant layer includes a polymer.

In one aspect, the adhesion promoting layer is formed by subjecting the aqueous bath to an increasing potential gradient and the corrosion resistant layer is formed by subjecting the aqueous bath to the increasing potential gradient.

In one aspect, the potential is applied to the aqueous bath within a voltage range of 0 V to about −250 V.

In one aspect, after the corrosion resistant layer is formed on the BIW structure, the BIW structure is removed from the aqueous bath, rinsed, and the corrosion resistant layer including the polymer is cured.

In one aspect, prior to pre-activating the surfaces of the BIW structure, the surfaces of the BIW structure are degreased and rinsed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. If, for some reason, the imprecision provided by "about" is not otherwise understood in the art with this ordinary meaning, then "about" as used herein may indicate a possible variation of up to 5% of the indicated value or 5% variance from usual methods of measurement.

As used herein, the term "composition" refers broadly to a substance containing at least the preferred metal elements or compounds, but which optionally comprises additional substances or compounds, including additives and impurities. The term "material" also broadly refers to matter containing the preferred compounds or composition.

In addition, disclosure of ranges includes disclosure of all values and further divided ranges within the entire range, including endpoints and sub-ranges given for the ranges.

Figure 1:
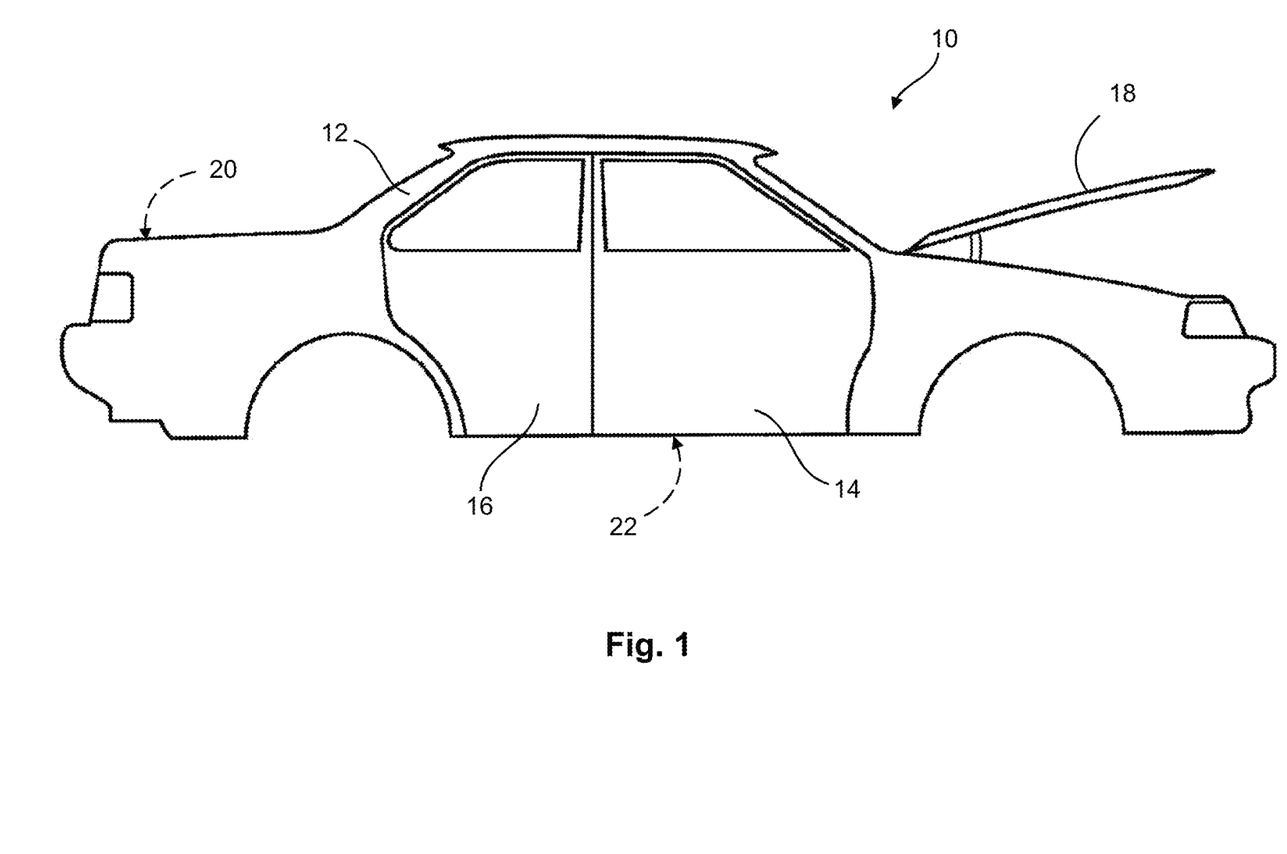
FIG. 1 shows a representative BIW structure.

The present disclosure provides methods of forming adhesion promoting and corrosion resistant layers over the surfaces of a BIW structure. The process may be a batch process or in certain aspects, a continuous process. Referring to FIG. 1, BIW structure 10 is shown that can subsequently be coated with the adhesion promoting and corrosion resistant layers contemplated herein. As described above, BIW structure 10 refers to an automobile's body sheet metal components, including frame 12, front door assembly 14, rear door assembly 16, engine compartment hood 18, a deck lid (not visible, but indicated at location 20), and a floor pan (not visible, but indicated at location 22). Each such component of BIW structure 10 defines at least one surface that can have adhesion promoting and corrosion resistant layers formed thereon, as described further below. It is contemplated that at least one of the aforementioned surfaces is comprised of an aluminum alloy. It is further contemplated that in certain embodiments, all of the surfaces are substantially free of a magnesium alloy. It is further contemplated that in some embodiments, at least one of the surfaces is a metallic surface comprising a metal selected from the group consisting of: iron (Fe), zinc (Zn), titanium (Ti), zirconium (Zr), and alloys and combinations thereof. In certain variations, the metallic surface may be a ferrous metal, such as steel, zinc, or TiZr, by way of example. It is further contemplated that in some embodiments, all of the surfaces are substantially free of a magnesium alloy and at least one surface comprises ferrous metal, zinc, or TiZr. The aforementioned disclosure, however, should not be considered to exclude combinations of the aforementioned metals, so long as at least one surface of the BIW structure comprises an aluminum alloy. As nonlimiting examples, in addition to aluminum alloys, the BIW structures may have at least one surface comprising a ferrous metal and at least one other surface comprising zinc or TiZr. A BIW structure may also have at least one surface comprising a ferrous metal and at least one surface comprising TiZr. It will be appreciated by those skilled in the art that numerous other components may be fabricated by the methods of the present invention, and that such additional components are deemed to be within the scope of the present invention. Thus, while exemplary components are illustrated and described throughout the specification, it is understood that the concepts in the present disclosure may also be applied to any component capable of being coated according to the disclosure herein, including those used in vehicles and automotive applications, other transportation applications, including aviation/aerospace, marine, industrial, commercial, and agricultural industries, among others. Specifically, the present disclosure is particularly suitable for any pieces of hardware requiring adhesion enhancement and corrosion resistance.

The use of such adhesion enhancement and corrosion resistance coatings has a number of advantages over BIW structures without similar coatings. Such coatings allow for subsequent layers of primer, paint, top coats, and the like, to be applied more efficiently and uniformly given the adhesion promoters disclosed herein. Further, providing additional corrosion resistance increases the useful life of the BIW structure, given the rate at which the underlying metal of the BIW structure would begin to rust decreases.

The techniques in the present disclosure are applicable to BIW structures including an aluminum alloy. Aluminum alloys may include a variety of different alloys, including those selected from the following aluminum alloy series, as they have been designated under the International Alloy Designation System: Alloy series 2XXX (two thousand series), which include copper-aluminum alloys; Alloy series 5XXX (five thousand series), which include magnesium-aluminum alloys (and in some circumstances have magnesium present in amounts of less than or equal to about 6.2 wt. %); Alloy series 6XXX (six thousand series), which include magnesium and silicon-aluminum alloys; and Alloy series 7XXX (seven thousand series), which include zinc-aluminum alloys. A suitable, non-limiting example of one aluminum alloy is aluminum alloy 6016, which comprises silicon at greater than or equal to about 1 wt. % to less than or equal 1.5 wt. %, magnesium at greater than or equal to about 0.25 to less than or equal to about 0.6 wt. %, iron at less than or equal to about 0.5 wt. %, manganese at less than or equal to about 0.2 wt. %, zinc at less than or equal to about 0.2 wt. %, copper at less than or equal to about 0.2 wt. %, titanium at less than or equal to about 0.15 wt. %, chromium at less than or equal to about 0.1 wt. %, residuals at less than or equal to about 0.15 wt. %, and a balance of aluminum.

As noted above, certain aluminum alloys may be "substantially free of a magnesium alloy" meaning an alloy that comprises less than or equal to about 1.5 wt. % magnesium, optionally less than or equal to about 1 wt. % magnesium; optionally less than or equal to about 0.5 wt. %, optionally less than or equal to about 0.1 wt. %, and in certain variations, at an impurity level or less (e.g., 0 wt. %).

Figure 2:
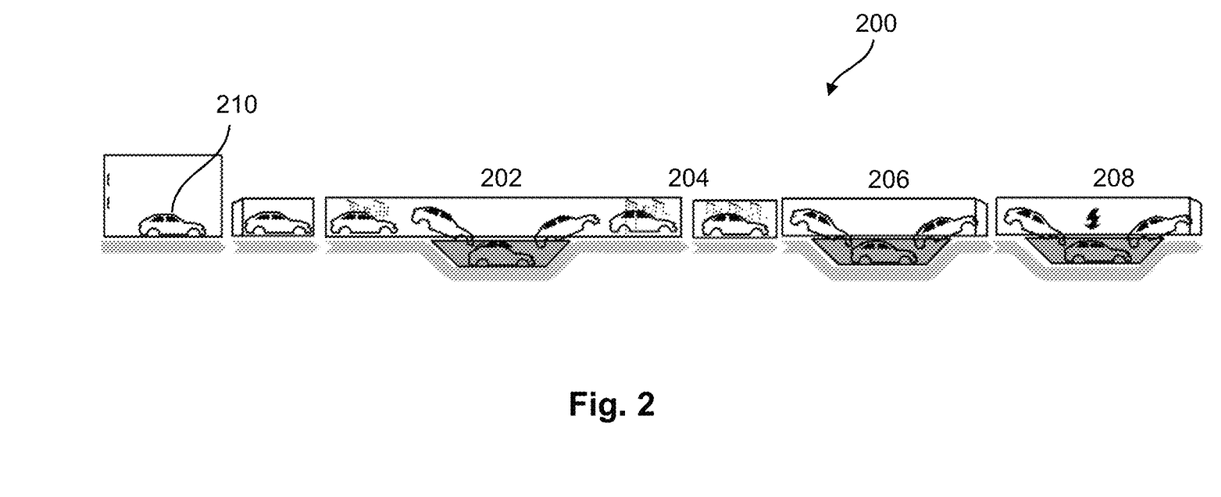
FIG. 2 shows an exemplary process for coating a BIW structure with adhesion promoting and corrosion resistant layers according to the present disclosure.

Referring to FIG. 2, a process 200 according to certain aspects of the present disclosure is shown. A BIW structure 210 having at least one surface comprising an aluminum alloy is degreased in degreasing bath 202. After degreasing, the BIW structure 210 having at least one surface comprising an aluminum alloy is rinsed, e.g., by rinsing station 204.

After rinsing, the BIW structure 210 having at least one surface comprising an aluminum alloy is transferred to pre-activation bath 206. In some aspects, pre-activation bath 206 comprises a rinsing and degreasing solution of distilled or regular water mixed with a soap solution. In some aspects, the pre-activation bath 206 comprises an acidic solution (such as hydrochloric acid, sulfuric acid, fluoric acid, or the like). In some aspects, pre-activation bath 206 comprises an alkaline solution (such as sodium hydroxide, sodium sulfate, or the like). In some aspects, pre-activation bath 206 includes an acidic bath and an alkaline bath. Here, the BIW structure 210 having at least one surface comprising an aluminum alloy is pre-activated. More specifically, aluminum in the BIW structure 210 having at least one surface comprising an aluminum alloy is exposed to an activating solution in pre-activating bath 206. Pre-activation enhances the rate at which the surfaces of the BIW structure 210 is subsequently coated with the adhesion promoting and corrosion resistant layers discussed more fully below. Notably, the aluminum on the surface of the BIW structure 210 having at least one surface comprising an aluminum alloy eliminates the need for other pre-cleaning steps that may otherwise be required to successfully coat the BIW structure 210 with the adhesion promoting and corrosion resistant layers. In this manner, the single pre-activation step provides a streamlined and efficient process to create pre-activated surfaces on the BIW structure 210.

After pre-activation, the BIW structure 210 having at least one surface comprising an aluminum alloy is transferred to a combined, modified adhesion promoting and electrocoating tank 208 that contains an aqueous bath. Notably, the combined, modified adhesion promoting and electrocoating tank 208 eliminates the need for separate steps that might otherwise occur between depositing the adhesion promoting layer and the corrosion resistant layer, including the following: 1) rinsing, 2) passivating the adhesion promoting layer, 3) rinsing such a passivated BIW part, and 4) removing the rinsing composition from the rinsed passivated BIW part. Modified adhesion promoting and electrocoating tank 208 contains an aqueous solution comprising an oxidizing composition comprising a source of cerium cations and a polymer precursor. The source of cerium cations of modified adhesion promoting and electrocoating tank 208 is capable of forming a conversion coating (i.e., the adhesion promoting layer) comprising cerium and oxygen with each surface of the BIW structure 210 having at least one surface comprising an aluminum alloy. The cerium and oxygen conversion coating is deposited by subjecting modified adhesion promoting and electrocoating tank 208, along with the BIW structure 210 having at least one surface comprising an aluminum alloy, to an increasing electrical potential. The cerium and oxygen conversion coating formed on the pre-activated surfaces serves as an adhesion promoting layer, allowing for subsequent layers to better adhere to the surfaces of the BIW structure 210 having at least one surface comprising an aluminum alloy. After a sufficient amount of adhesion promoting layer has been deposited on the BIW structure 210 having at least one surface comprising an aluminum alloy, the polymer precursor begins to deposit as a layer of polymer onto the BIW structure 210 having at least one surface comprising an aluminum alloy. This deposited electrocoat comprising polymer serves as a corrosion resistant layer.

The BIW structure 210 having at least one surface comprising an aluminum alloy is in electrical connection as a cathode in modified adhesion promoting and electrocoating tank 208 to at least an anode. As a result of the electrical connection, the BIW structure 210 is exposed to potential/subjected to a voltage range that may increase over time as the BIW structure 210 passes through the electrocoating tank 208. In some embodiments, the potential is applied in a voltage range that is greater than 0 V (although it may be a negative voltage/polarity with respect to ground) to about 250V or −250 V (positive or negative with respect to ground). The potential applied to the aqueous bath may be increased over time as a voltage gradient.

The conversion coating composition, in all aspects, coats each surface of the BIW structure 210 having at least one surface comprising an aluminum alloy. The resulting conversion coating or adhesion promoting layer is comprised of cerium, oxygen, and in some instances is further comprised of the underlying metal alloy. The precursors of the cerium coating materials may be used in amounts of greater than or equal to about 5 to less than or equal to about 20 grams per liter of the aqueous bath. In one embodiment, cerium trichloride salt provides the source of cerium cations. In this embodiment, cerium cations (+3) react with each of the surfaces of the BIW structure 210 having at least one surface comprising an aluminum alloy to form a cerium-containing and oxygen-containing adhesion promoting layer. As noted above, the conversion coating may further comprise metals from the underlying metal alloy. The resulting conversion coating forms thin cratered and irregularly shaped coating layers to which the subsequent electrocoat layer (i.e., the corrosion resistant layer) adheres.

In some embodiments, modified adhesion promoting and electrocoating tank 208 further includes additional oxidizing compositions selected from the group consisting of silicon-based compounds, titanium-based compounds, vanadium-based compounds, and zirconium-based components. The resulting conversion coating comprises cerium, oxygen, and is further comprised of the additional oxidizing compositions selected from the group consisting of silicon-based compounds, titanium-based compounds, vanadium-based compounds, and zirconium-based compounds. Further, the resulting conversion coating may comprise metals from the underlying metal alloy. As noted above, the resulting conversion coating forms thin cratered and irregularly shaped coating layers to which the subsequent electrocoat corrosion resistant layer adheres. In alternative aspects, these oxidizing compositions may be used in lieu of cerium compounds.

As noted above, the application of voltage potential to the aqueous bath allows for deposition of both the adhesion promoting layer and the water-dispersed polymeric precursors or primers, which deposit over the adhesion promoting layer. When deposited, the precursors can form a polymer layer that is corrosion resistant. Notably, the adhesion promoting layer and the corrosion resistant layer are each formed in the same modified adhesion promoting and electrocoating tank 208. In an aspect, DuPont Electroshield™ 21 gray bath provides the polymer precursor primers; such a bath comprises water at greater than or equal to about 71 wt. % to less than or equal to about 82 wt. %, epoxy resin at greater than or equal to about 16 wt. % to less than or equal to about 26 wt. %, and titanium dioxide at about 1.3 wt. %. And as noted above, if such a bath is used, the bath further comprises a source of cerium cations at greater than or equal to about 0.5 wt. % to less than or equal to about 2 wt. % of the total aqueous bath weight.

The mechanism of forming the adhesion promoting and corrosion resistant layers includes: 1) hydroxide production at the cathode side and an increase in the local pH value of the aqueous solution; 2) migration of charged micelles to the cathode; 3) discharge and coagulation of the micelles due to local pH increase and 4) elimination of water from the deposited polymers by electro-osmosis. As indicated above, cerium cations (e.g., $Ce^{+3}$) react with each of the surfaces of the BIW structure 210 having at least one surface comprising an aluminum alloy to form a conversion coating on the surfaces. Under the increasing voltage potential gradient, hydrogen is evolved at the cathodic body with the production of hydroxide. Resin micelles react with hydroxide ions at the BIW structure 210 having at least one surface comprising an aluminum alloy and resin (and titanium oxide pigment particles) is deposited on the conversion coating (e.g., adhesion promoting coating). Oxygen and hydrogen ions are released at the anode. Cerium cations may also be entrained in the deposited polymer coating and can migrate to the coated metal surface for further reaction with the metal elements. The entire duration for which the BIW structure 210 is immersed in modified adhesion promoting and electrocoating tank 208 may be on the order of greater than or equal to about 2 minutes to less than or equal about 3 minutes, by way of example. After sufficient coatings have been obtained, the BIW structure 210 is removed from modified adhesion promoting and electrocoating tank 208.

In some embodiments, after the coatings described above are sufficiently obtained, the BIW structure 210 is rinsed by conveying the BIW structure 210 through a series of rinses with water and de-ionized water. The combination of rinses may include sprayings and/or immersions. After rinsing, the BIW structure 210 is dried (e.g., by an air blower) to remove excess rinsing agent. The BIW structure 210 is then conveyed through a baking oven to cure the polymerization of the electrocoat. After curing, the BIW structure 210 may be further painted as warranted.

In one exemplary method, the process comprises forming an adhesion promoting layer and a corrosion resistant layer over the surfaces of a BIW structure. The method comprises pre-activating the surfaces of the BIW structure by immersing the BIW structure in a pre-activating bath. The surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof. The pre-activating bath forms pre-activated surfaces on the BIW structure. The pre-activated BIW structure is then transferred to an aqueous bath comprising a source of cerium cations and a polymer precursor. The cerium cations coat or plate onto the surfaces of the BIW structure during application to the aqueous bath a potential for a time period sufficient to form a cerium plating over the surfaces of the BIW structure. After, a corrosion resistant layer including a polymer formed from the polymer precursor is deposited over the surfaces of the BIW structure while the potential is applied to the aqueous bath. In certain other variations, the surfaces of the BIW structure are substantially free of magnesium alloys. In yet other aspects, the potential is applied to the aqueous bath within a voltage range of less than or equal to about 0 V to greater than or equal to about −250 V. In further aspects, after the surfaces of the BIW structure are pre-activated, the BIW structure is removed from the pre-activation bath and directly transferred to the aqueous bath to deposit the adhesion promoting layer and the corrosion resistant layer. In yet further aspects, prior to pre-activating the surfaces of the BIW structure, the surfaces of the BIW structure are degreased and rinsed. In still further aspects, after the corrosion resistant layer is deposited on the BIW structure, the BIW structure is removed from the aqueous bath, rinsed, and the polymers forming the corrosion resistant layer are cured.

In another example, the process may consist essentially of the following steps. The surfaces of a BIW structure is pre-activated by immersing the BIW structure in a pre-activating bath. The surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof. The pre-activating bath forms pre-activated surfaces on the BIW structure. The pre-activated BIW structure is then transferred to an aqueous bath comprising a source of cerium cations and a polymer precursor. The cerium cations coat or plate onto the surfaces of the BIW structure during application to the aqueous bath a potential to form a cerium plating over the surfaces of the BIW structure. Notably, cerium cations will coat with only a small voltage applied, while polymer deposition generally requires a higher voltage. After, a corrosion resistant layer including a polymer formed from the polymer precursor/primer is deposited over the surfaces of the BIW structure while the potential is applied to the aqueous bath. In certain other variations, such a process may be further limited as follows: (1) the surfaces of the BIW structure are substantially free of magnesium alloys; (2) the potential is applied to the aqueous bath within a voltage range of 0 V to about −250 V; (3) the process further consists essentially of, after the surfaces of the BIW structure are pre-activated, removing the BIW structure from the pre-activation bath and directly transferring to the aqueous bath to deposit the adhesion promoting layer and the corrosion resistant layer; (4) the process further consists essentially of, prior to pre-activating the surfaces of the BIW structure, the degreasing and rinsing the surfaces of the BIW structure; (5) the process further consists essentially of, after the corrosion resistant layer is deposited on the BIW structure, removing the BIW structure from the aqueous bath, rinsing the BIW structure, and curing the polymers forming the corrosion resistant. Notably, there is no requirement for preliminary cleaning steps before pre-activating the BIW structure and the steps of forming the adhesion promoting layer and corrosion resistant layer are formed in one aqueous bath.

In another exemplary method, the process comprises forming an adhesion promoting layer and a corrosion resistant layer over the surfaces of a BIW layer. The surfaces of the BIW structure are pre-activated by immersing the BIW structure in an pre-activating bath. The surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof, but the surfaces are substantially free of magnesium alloys. The pre-activating bath forms pre-activated surfaces on the BIW structure. After pre-activation, a multilayer cerium-based electrocoat is formed over the pre-activated surfaces of the BIW structure by immersing the pre-activated surfaces of the BIW structure in an aqueous bath comprising a sources of cerium cations and a polymer precursor by applying a potential to the aqueous bath to deposit the cerium cations in a first layer and the polymer in a second layer over the first layer. In other aspects, the first layer is an adhesion promoting layer comprising a cerium coating and the second layer is a corrosion resistant layer comprising the polymer. In other aspects, the potential is applied to the aqueous bath within a voltage range of 0 V to about −250 V. In yet other aspects, after the corrosion resistant layer is formed on the BIW structure, the BIW structure is removed from the aqueous bath, rinsed, and the polymer coating forming the corrosion resistant layer is cured. In further aspects, prior to pre-activating the surfaces of the BIW structure, the surfaces of the BIW structure are degreased and rinsed.

In another example, a process may consist essentially of forming an adhesion promoting layer and a corrosion resistant layer over the surfaces of a BIW layer. The surfaces of the BIW structure are pre-activated by immersing the BIW structure in a pre-activating bath. The surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof, but the surfaces are substantially free of magnesium alloys. The pre-activating bath forms pre-activated surfaces on the BIW structure. After pre-activation, a multilayer cerium-based electrocoat is formed over the pre-activated surfaces of the BIW structure by immersing the pre-activated surfaces of the BIW structure in an aqueous bath comprising a sources of cerium cations and a polymer precursor by applying a potential to the aqueous bath to deposit the cerium cations in a first layer and the polymer in a second layer over the first layer. In certain other variations, the process may be further limited as follows: (1) having the first layer comprise an adhesion promoting layer comprising a cerium coating and the second layer comprising a corrosion resistant layer comprising the polymer; (2) having the first layer comprise an adhesion promoting layer comprising a cerium coating and the second layer comprising a corrosion resistant layer comprising the polymer, wherein the process further consists essentially of applying to the aqueous bath the potential within a voltage range of about 0 V to about −250 V; (3) further consisting essential of, after the corrosion resistant layer is formed on the BIW structure, the BIW structure is removed from the aqueous bath, rinsed, and the polymer coating forming the corrosion resistant layer is cured; and (4) further consisting essentially of, before pre-activating the surfaces of the BIW structure, degreasing and rinsing the surfaces of the BIW structure. Notably, there is no requirement for preliminary cleaning steps before pre-activating the BIW structure and the steps of forming the adhesion promoting layer and corrosion resistant layer are formed in one aqueous bath.

In another exemplary method, a process of forming an adhesion promoting layer and a corrosion resistant layer over the surfaces of a BIW structure for use in a continuous process comprises pre-activating the surfaces of the BIW structure by transporting and immersing the BIW structure in a pre-activating bath. The surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof, but the surfaces are substantially free of magnesium alloys. The pre-activating bath forms pre-activated surfaces on the BIW structure. An adhesion promoting layer comprising cerium is formed over the pre-activated surfaces of the BIW structure and a corrosion resistant layer comprising a polymer is formed over the adhesion promoting layer by transporting and immersing the pre-activated surfaces of the BIW structure in an aqueous bath comprising a source of cerium cations and a polymer precursor. In other aspects, the adhesion promoting layer is formed by subjecting the aqueous bath to a potential and the corrosion resistant layer is subsequently formed by exposure to the potential while in the aqueous bath. In even further aspects, the potential is applied to the aqueous bath within a voltage range of 0 V to about −250 V. In yet other aspects, after the corrosion resistant layer is formed on the BIW structure, the BIW structure is removed from the aqueous bath, rinsed, and the corrosion resistant layer comprising the polymer is cured. In yet further aspects, prior to pre-activating the surfaces of the BIW structure, the surfaces of the BIW structure are degreased and rinsed.

In another exemplary method, a process of forming an adhesion promoting layer and a corrosion resistant layer over the surfaces of a BIW structure for use in a continuous process consists essentially of pre-activating the surfaces of the BIW structure by transporting and immersing the BIW structure in a pre-activating bath. The surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof, but the surfaces are substantially free of magnesium alloys. The pre-activating bath forms pre-activated surfaces on the BIW structure. An adhesion promoting layer comprising cerium is formed over the pre-activated surfaces of the BIW structure and a corrosion resistant layer comprising a polymer is formed over the adhesion promoting layer by transporting and immersing the pre-activated surfaces of the BIW structure in an aqueous bath comprising a source of cerium cations and a polymer precursor. In certain other variations, the process may be further limited as follows: (1) further consisting essentially of forming the adhesion promoting layer by subjecting the aqueous bath to a potential and forming the corrosion resistant layer by exposure to the potential while in the aqueous bath; (2) further consisting essentially of forming the adhesion promoting layer, wherein the potential is applied to the aqueous bath within a voltage range of greater than or equal to about 0 V to about −250 V; (3) further consisting essentially of, after the corrosion resistant layer is formed on the BIW structure, removing the BIW structure from aqueous bath, rinsing the BIW structure, and the corrosion resistant layer comprising the polymer is cured; and (4) further consisting essentially of, before pre-activating the surfaces of the BIW structure, degreasing and rinsing the surfaces of the BIW structure. Notably, there is no requirement for preliminary cleaning steps before pre-activating the BIW structure and the steps of forming the adhesion promoting layer and corrosion resistant layer are formed in one aqueous bath.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming an adhesion promoting layer and a corrosion resistant layer over surfaces of a body-in-white ("BIW") structure, the method comprising:

pre-activating surfaces of the BIW structure, wherein the surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof, the surfaces being substantially free of magnesium alloys, by immersing the BIW structure in a pre-activating bath to form pre-activated surfaces on the BIW structure;

forming an adhesion promoting layer comprising cerium over the pre-activated surfaces of the BIW structure by immersing the pre-activated surfaces of the BIW structure in an aqueous bath comprising a source of cerium cations and a polymer precursor, wherein an increasing potential gradient is applied to the aqueous bath and the cerium cations coat the pre-activated surfaces of the BIW structure to form the adhesion promoting layer comprising cerium over the surfaces of the BIW structure; and forming a corrosion resistant layer comprising a polymer formed from the polymer precursor over the adhesion promoting layer comprising cerium while the increasing potential gradient is applied to the aqueous bath, so that the polymer deposits over the adhesion promoting layer on the surfaces of the BIW structure.

2. The method of claim 1, wherein the increasing potential gradient is applied to the aqueous bath within a voltage range of 0 V to about −250 V.

3. The method of claim 1, wherein after the pre-activating the surfaces of the BIW structure, the BIW structure is removed from the pre-activation bath and directly transferred to the aqueous bath to deposit the adhesion promoting layer and the corrosion resistant layer.

4. The method of claim 1, wherein prior to the pre-activating the surfaces of the BIW structure, the surfaces of the BIW structure are degreased and rinsed.

5. The method of claim 1, wherein after the corrosion resistant layer is deposited on the BIW structure, the BIW structure is removed from the aqueous bath, rinsed, and the polymer forming the corrosion resistant layer is cured.

6. The method of claim 1, wherein the pre-activating bath comprises an acid bath comprising hydrochloric acid or hydrofluoric acid.

7. The method of claim 1, wherein the pre-activating bath comprises an alkaline bath comprising sodium hydroxide or sodium sulfate.

8. The method of claim 1, wherein the pre-activating bath comprises an acid bath comprising hydrochloric acid, sulfuric acid, or hydrofluoric acid and an alkaline bath comprising sodium hydroxide or sodium sulfate.

9. A method of forming an adhesion promoting layer and a corrosion resistant layer over surfaces of a BIW structure, the method comprising:

pre-activating surfaces of the BIW structure, wherein the surfaces of the BIW structure comprise at least an aluminum alloy surface and a metallic surface comprising a metal selected from the group consisting of: iron (Fe), zinc (Zn), titanium (Ti), zirconium (Zr), and alloys and combinations thereof, by immersing the BIW structure in a pre-activating bath to form pre-activated surfaces on the BIW structure, wherein the surfaces of the BIW structure are substantially free of magnesium alloys; and forming a multilayer cerium-based electrocoat over the pre-activated surfaces of the BIW structure by immersing the pre-activated surfaces of the BIW structure in an aqueous bath comprising a source of cerium cations and a polymer precursor and applying an increasing potential gradient to the aqueous bath to deposit the cerium cations in a first layer and a polymer in a second layer over the first layer.

10. The method of claim 9, wherein the first layer is an adhesion promoting layer comprising a cerium coating and the second layer is a corrosion resistant layer comprising the polymer.

11. The method of claim 9, wherein the increasing potential gradient is applied to the aqueous bath within a voltage range of 0 V to about −250 V.

12. The method of claim 9, wherein after the corrosion resistant layer is formed on the BIW structure, the BIW structure is removed from the aqueous bath, rinsed, and the polymer coating forming the corrosion resistant layer is cured.

13. The method of claim 9, wherein prior to pre-activating the surfaces of the BIW structure, the surfaces of the BIW structure are degreased and rinsed.

14. A method of forming an adhesion promoting layer and a corrosion resistant layer over surfaces of a BIW structure for use in continuous process, the method comprising:

pre-activating the surfaces of the BIW structure, wherein the surfaces of the BIW structure comprise at least an aluminum alloy surface and a metallic surface comprising iron (Fe), zinc (Zn), titanium (Ti), zirconium (Zr), and alloys and combinations thereof, and the surfaces are substantially free of magnesium alloys by transporting and immersing the BIW structure in a pre-activating bath to form pre-activated surfaces on the BIW structure, the pre-activating bath comprising at least one of an acid bath comprising hydrochloric acid or hydrofluoric acid or an alkaline bath comprising sodium hydroxide or sodium sulfate; and forming an adhesion promoting layer comprising cerium over the pre-activated surfaces of the BIW structure and forming a corrosion resistant layer over the adhesion promoting layer by transporting and immersing the pre-activated surfaces of the BIW structure in an aqueous bath comprising a source of cerium cations and a polymer precursor and applying an increasing potential gradient to the aqueous bath, wherein the adhesion promoting layer comprises cerium and the corrosion resistant layer comprises a polymer.

15. The method of claim 14, wherein the increasing potential gradient is applied to the aqueous bath within a voltage range of 0 V to about −250 V.

16. The method of claim 14, wherein after the corrosion resistant layer is formed on the BIW structure, the BIW structure is removed from the aqueous bath, rinsed, and the corrosion resistant layer comprising the polymer is cured.

17. The method of claim 14, wherein prior to pre-activating the surfaces of the BIW structure, the surfaces of the BIW structure are degreased and rinsed.

* * * * *